(12) United States Patent
Mizusawa

(10) Patent No.: US 7,480,095 B2
(45) Date of Patent: *Jan. 20, 2009

(54) MICROSCOPE

(75) Inventor: Masayuki Mizusawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/125,314

(22) Filed: May 10, 2005

(65) Prior Publication Data

US 2005/0254124 A1 Nov. 17, 2005

(30) Foreign Application Priority Data

May 17, 2004 (JP) ............................. 2004-146089

(51) Int. Cl.
*G02B 21/06* (2006.01)
*G02B 21/00* (2006.01)

(52) U.S. Cl. ..................... 359/388; 359/381; 359/385

(58) Field of Classification Search ......... 359/368–390, 359/618–624, 642, 710, 733
See application file for complete search history.

(56) References Cited

U.S. PATENT DOCUMENTS

| 4,063,797 | A | * | 12/1977 | Taira | 359/385 |
| 4,185,891 | A | * | 1/1980 | Kaestner | 372/9 |
| 4,253,726 | A | * | 3/1981 | Taira | 359/388 |
| 5,513,201 | A | * | 4/1996 | Yamaguchi et al. | 372/75 |
| 5,777,784 | A | * | 7/1998 | Tanaka | 359/388 |
| 5,900,981 | A | * | 5/1999 | Oren et al. | 359/619 |
| 6,507,434 | B2 | * | 1/2003 | Miyashita | 359/387 |
| 6,853,490 | B2 | * | 2/2005 | Wang et al. | 359/621 |
| 7,248,404 | B2 | * | 7/2007 | Mizusawa | 359/385 |

FOREIGN PATENT DOCUMENTS

| JP | 07-120681 | 5/1995 |
| JP | 10-104523 | 4/1998 |
| JP | 2003-167197 | 6/2003 |

* cited by examiner

*Primary Examiner*—Thong Nguyen
(74) *Attorney, Agent, or Firm*—Pillsbury Winthrop Shaw Pittman LLP

(57) ABSTRACT

The invention provides a microscope in which the utilization efficiency of light from light sources is high and which can use a bright, uniform line illumination. The microscope includes a plurality of light sources; a fly-eye lens having a plurality of lens elements arrayed in a rectangular shape corresponding to the light sources, the light sources being disposed at the focal points thereof; a cylindrical lens having a flat surface orthogonal to the optical axis of light emitted from the fly-eye lens, and a cylindrical surface whose longitudinal axis is disposed parallel to the arrayed direction of the fly-eye lens; and an objective lens that illuminates a specimen with light from the cylindrical lens.

8 Claims, 4 Drawing Sheets

MICROSCOPE

This application relies for the benefit of priority upon Japanese Patent Application No. 2004-146089, filed May 17, 2004, the contents of which are hereby incorporated by reference.

BACKGROUND OF THE INVENTION

1. Field of the Invention

The present invention relates to a microscope including a line illumination.

2. Description of Related Art

Known microscopes including line illumination include, for example, those disclosed in Japanese Unexamined Patent Applications Publication Nos. HEI-7-120681, HEI-10-104523, and 2003-167197.

In the microscope disclosed in Japanese Unexamined Patent Application Publication No. HEI-7-120681, which includes a conventional incident-illumination optical system with a single light source, a cylindrical lens is inserted between an aperture stop and an objective lens, and a circular beam of light formed by the aperture stop is focused to a straight line by the cylindrical lens to form a line illumination. Some of the light from the light source is thus wasted.

In the microscope disclosed in Japanese Unexamined Patent Application Publication No. HEI-10-104523, optical fibers are arranged side-by-side to form a line-shaped light source, and the light from this light source passes through a slit to form a line illumination.

In the microscope disclosed in Japanese Unexamined Patent Application Publication No. 2003-167197, a plurality of slits are arranged near a light source, and the light beams passing through these slits form a line illumination serving as illumination light. This arrangement has high light utilization efficiency.

However, in the microscope disclosed in Japanese Unexamined Patent Application Publication No. HEI-7-120681, since a circular beam is focused to a straight line by the cylindrical lens, the illumination is elliptical. Furthermore, this microscope suffers from the problem of luminance variation at the central region and the peripheral region of the ellipse.

The microscope disclosed in Japanese Unexamined Patent Application Publication No. HEI-10-104523, suffers from the problem in that the optical fibers serving as the light source have low light utilization efficiency.

In the microscope disclosed in Japanese Unexamined Patent Application Publication No. 2003-167197, since only the light passing through the slits forms the line illumination, there is still a large amount of light that cannot pass through the slits, and therefore, the light utilization efficiency is not high enough.

BRIEF SUMMARY OF THE INVENTION

In light of the problems described above, it is an object of the present invention to provide a microscope in which the utilization efficiency of light from a light source is high and which can use a uniform line illumination.

In order to achieve the above-described object, the present invention provides the following solutions.

According to one aspect, the present invention provides microscope including a plurality of light sources; a fly-eye lens having a plurality of lens elements arrayed in a rectangular shape corresponding to the light sources, the light sources being disposed at the focal points thereof; a cylindrical lens having a flat surface orthogonal to the optical axis of light emitted from the fly-eye lens, and a cylindrical surface whose longitudinal axis is disposed parallel to the arrayed direction of the fly-eye lens; and an objective lens that illuminates a specimen with light from the cylindrical lens.

In the aspect of the invention described above, the fly-eye lens is preferably formed in a rectangular shape by a plurality of lens-element rows in which the lens elements are arrayed in a straight line.

In the configuration described above, identical adjacent lens-element rows are arranged so as to be shifted in the arrayed direction by substantially half of the array pitch of the lens elements constituting the lens-element rows.

In the configuration described above, the number of lens-element rows is preferably even.

In the aspect of the invention described above, the light sources and the lens elements are preferably arranged in one-to-one correspondence, and the numerical apertures thereof are made to match.

In the aspect of the invention described above, the radius of each lens element is preferably from 1.5 mm to 5 mm, inclusive.

According to the present invention, a beam having a substantially uniform width in the longitudinal direction of a line illumination formed by a cylindrical lens is focused. This affords an advantage in that it is possible to achieve a uniformly bright line illumination with little variation in luminance all the way to both ends thereof.

DETAILED DESCRIPTION OF THE INVENTION

Figure 1:
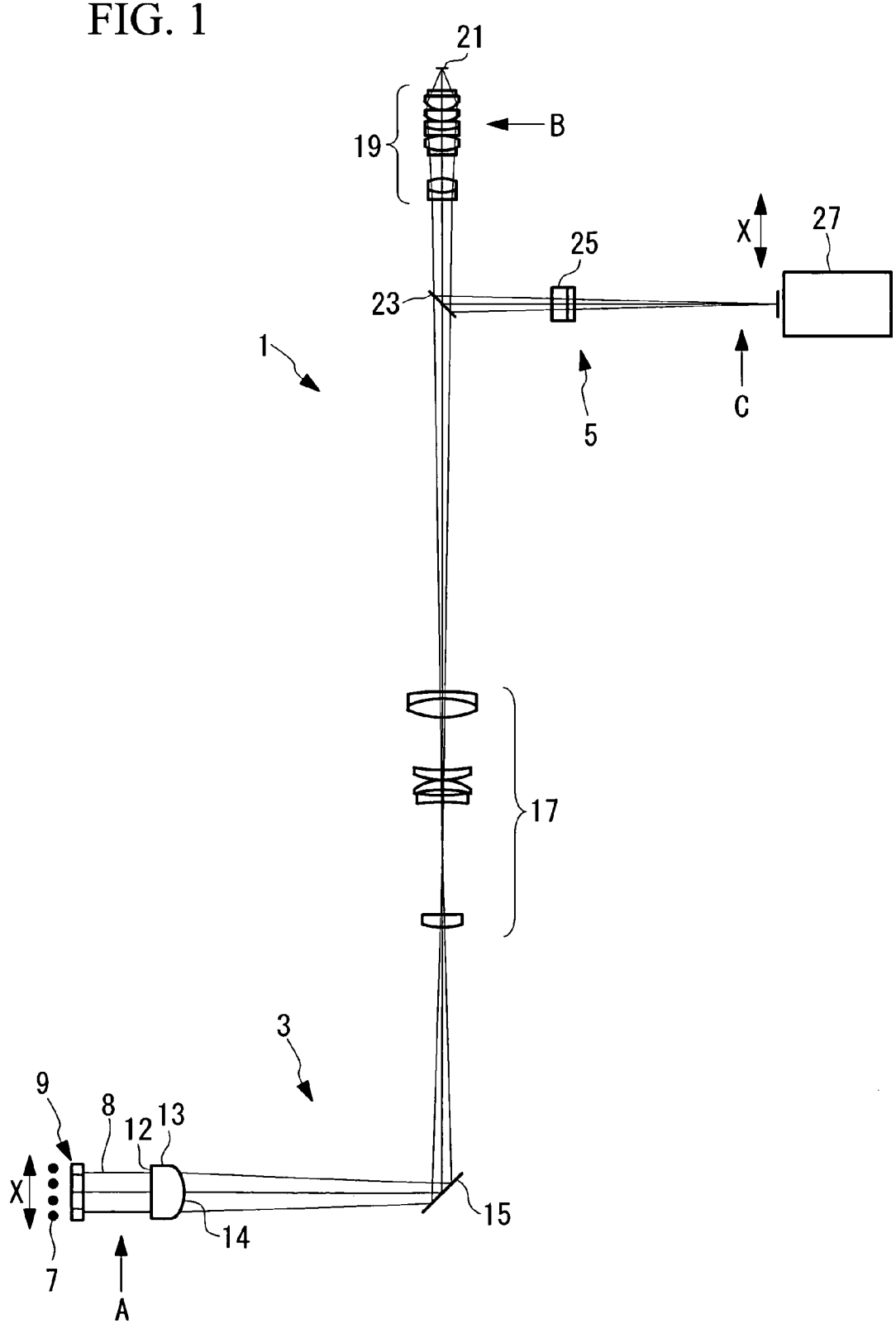
FIG. 1 is a schematic diagram of a microscope according to an embodiment of the present invention.

A microscope according to an embodiment of the present invention will be described below with reference to FIG. 1 to FIGS. 5A and 5B.

A microscope 1 according to this embodiment includes an illumination optical system 3 and an imaging system 5.

The illumination optical system 3 is provided with a plurality of light sources 7, a fly-eye lens 9 including lens elements 11 for converting light from the light sources 7 into substantially collimated beams, a cylindrical lens 13 disposed in a optical path 8 from the fly-eye lens 9, a mirror 15 for changing the direction of the optical path 8, a relay lens 17, and an objective lens 19.

Figure 3:
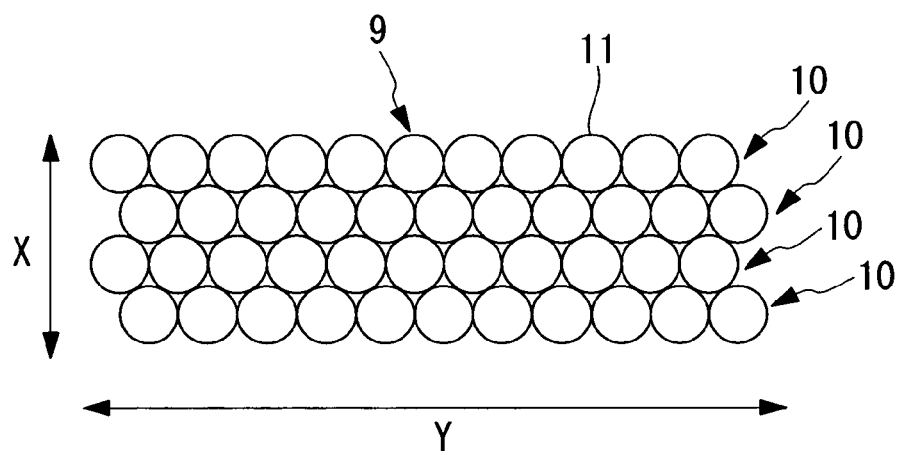
FIG. 3 is a front view of a fly-eye lens according to an embodiment of the present invention.

As shown in FIG. 3, the fly-eye lens 9 includes many lens elements 11. The lens elements 11 form lens-element rows 10 in which the lens elements 11 are bonded together and lined up in straight lines in the Y direction (arrayed direction). These lens-element rows 10 form a fly-eye lens 9 in which an even number of rows, for example, four rows, are stacked in the X direction orthogonal to the Y direction. The fly-eye lens 9 is configured so that adjacent lens-element rows that are stacked together are shifted in the Y direction by a distance equal to the lens radius, and the lens elements 11 of another, adjacent lens-element row 10 are disposed between adjacent lens elements 11 in one lens-element row 10. In other words, the lens elements are arrayed in a so-called hexagonal arrangement.

The radius of each lens element 11 is preferably from 1.5 mm to 5 mm, inclusive.

If the radius of each lens element 11 is less than 1.5 mm, it is difficult to integrate them with the light source 7. If the diameter of each lens element 11 is greater than 5 mm, the spaces between each lens element 11, in other words, the parts where there is no light, become large, and as a result, the luminance variation in the line illumination becomes so large as to be impractical.

The light sources 7 are, for example, white LEDs, and the same number as the number of lens elements 11 is provided. The light sources 7 have the same numerical aperture as the lens elements 11 and are disposed at the corresponding focal points of the lens elements 11.

A two-dimensional light-source image formed by a projection optical system may be used as the light sources.

The cylindrical lens 13 is disposed such that a flat surface 12 thereof is perpendicular to the optical path 8 from the fly-eye lens 9 and the longitudinal axis of a cylindrical surface 14 is parallel to the Y-axis. Accordingly, the cylindrical lens 13 has refractive power in the X direction (see FIG. 1), and has no refractive power in the Y direction (see FIG. 2A) so that light passes straight through in that direction.

The mirror 15 is for deflecting the light beam from the cylindrical lens 13 towards the objective lens 19.

The relay lens 17, which relays an image formed by the cylindrical lens 13 to the objective lens 19, is disposed between the mirror 15 and the objective lens 19.

The objective lens 19 is formed by combining a plurality of lenses, and is designed to irradiate a specimen 21 with light traveling along the optical path 8, to serve as illumination therefore, and also to transmit reflected light from the specimen 21 toward the imaging system 5.

A half-mirror 23, an imaging lens 25, and an imaging device 27 are provided in the imaging system 5.

The half-mirror 23 is disposed in the optical path 8 and is configured so as to guide reflected light from the objective lens 19 to the imaging lens 25. The half-mirror 23 may be a dichroic mirror.

The imaging lens 25 is configured so as to focus reflected light from the half-mirror 23 onto the surface of the imaging device 27.

The imaging device 27 is, for example, a CCD and converts the light focused onto the surface thereof into an electrical signal, which is then processed.

The operation of the microscope 1 according to this embodiment, having this configuration, will now be described below.

Figure 2A:
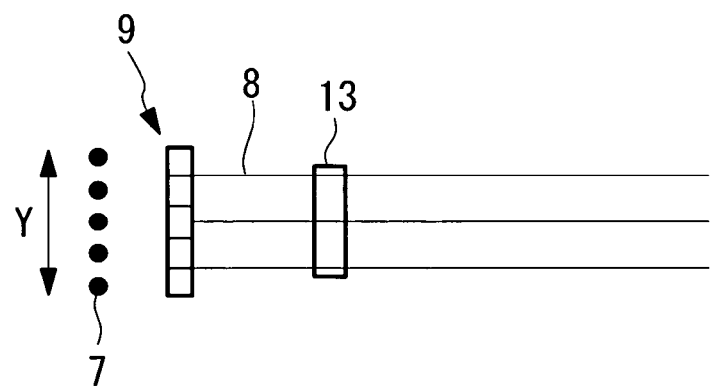
FIG. 2A is a close-up view of section A in FIG. 1.
Figure 2B:
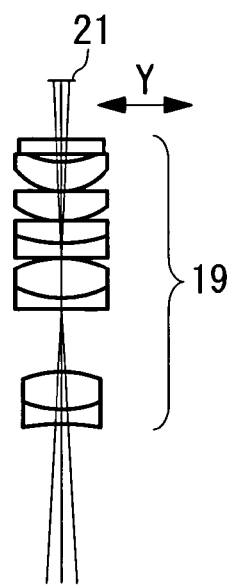
FIG. 2B is a close-up view of section B in FIG. 1.
Figure 2C:
FIG. 2C is a close-up view of section C in FIG. 1.

FIG. 1 shows a ray diagram in the X direction. FIGS. 2A, 2B, and 2C show partial ray diagrams in the Y direction.

The light generated in the light sources 7 is incident on the lens elements 11 in the fly-eye lens 9. This light is converted into substantially collimated beams in the lens elements 11, and is emitted towards the cylindrical lens 13.

In such a case, since the numerical apertures of the light sources 7 and the lens elements 11 are the same, the light beams from the light sources 7 are incident only on the corresponding lens elements 11. Also, since the light sources 7 are disposed at the focal points of the lens elements 11, the light beams are effectively converted to collimated beams by the lens elements 11.

Moreover, since an even number of lens-element rows 10 are provided, the X-direction light intensity is substantially uniform in the Y-direction.

Therefore, light emitted from the fly-eye lens 9 has the same shape as the shape in which the lens elements are arrayed, that is, a rectangular shape in cross-section, and is a collimated beam having substantially uniform intensity.

The collimated light incident on the cylindrical lens 13 is not refracted in the Y-direction (see FIG. 2A) but is refracted only in the X-direction (see FIG. 1). Therefore, the beam width in the Y-direction remains constant and the beam width in the X-direction is reduced as the beam propagates along the light path 8.

The light beam is then reflected at the mirror 15, is deflected towards the objective lens 19, and is focused in a line parallel to the Y-direction in the middle of the relay lens 17, in other words at the focal position of the cylindrical lens 13.

The focal length of the cylindrical lens 13 is preferably from 100 mm to 350 mm, inclusive. If the focal length is less than 100 mm, the numerical aperture of the cylindrical lens 13 becomes too large, resulting in excessive spherical aberration, and therefore, uniform illumination cannot be obtained. If the focal length is longer than 350 mm, the overall length of the optical system becomes too long, and the apparatus thus becomes too large. In this embodiment, the focal length is 220 mm, for example.

Thereafter, as shown in FIG. 1, the beam width in the X direction increases, and the beam is incident on the objective lens 19 and is focused onto the surface of the specimen 21 by the objective lens 19.

On the other hand, as shown in FIG. 2B, in the Y direction, after being focused in the middle of the objective lens 19, the light is expanded and illuminates the surface of the specimen 21.

With this configuration, an extended line illumination in the Y-direction is provided at the surface of the specimen 21.

Figure 5A:
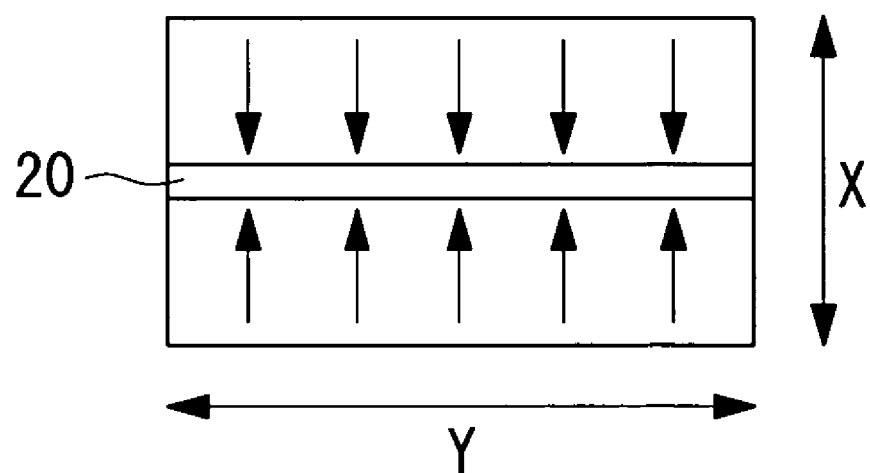
FIG. 5A is a diagram for explaining the focused state using line illumination of the microscope according to the embodiment of the present invention.
Figure 5B:
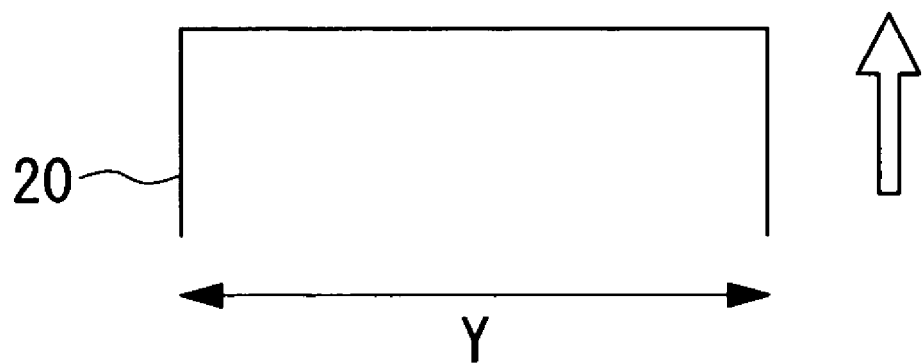
FIG. 5B is an explanatory diagram showing the intensity distribution in the Y-direction in FIG. 5A.

In this case, the collimated light from the fly-eye lens 9 is substantially rectangular, as shown in FIG. 5A. In other words, since the X-direction distances are substantially equal along the Y direction, a line illumination 20 extending in the Y direction has substantially uniform light intensity focused in the longitudinal direction thereof. Therefore, as shown in the illumination distribution of the line illumination 20 in FIG. 5B, the line illumination 20 can achieve uniform illumination that remains bright all the way to the ends thereof, with little luminance variation.

Figure 4:
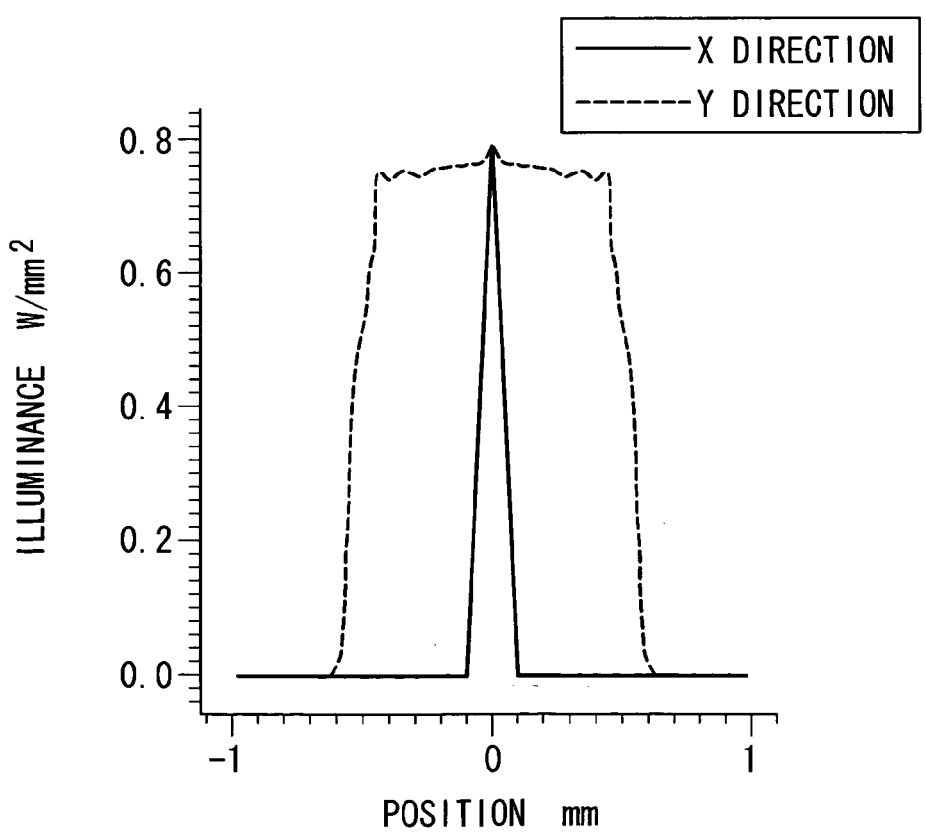
FIG. 4 is a graph showing the intensity distribution at a specimen surface when illuminated by a line illumination of the microscope according to the embodiment of the present invention.

FIG. 4 shows the luminance distribution, in the X and Y directions, at the surface of the specimen when illuminated by the line illumination of this embodiment. From this figure, it is clear that a sufficiently uniform brightness in the Y direction can be obtained in practice.

Also, since all of the light entering the fly-eye lens 9 can all be converted to line illumination, and the light directed towards the fly-eye lens 9 from the light sources 7 is not limited, the light utilization efficiency can be improved compared to the conventional case where, for example, only light incident via slits is used.

Reflection light that is reflected from the specimen illuminated with the line illumination passes through the objective lens 19, is reflected by the half-mirror 23, and is imaged onto the surface of the imaging device 27 by the imaging lens 25.

The image formed on the surface of the imaging device 25 is focused in the X direction, as shown in FIG. 1, and has a certain length in the Y direction, as shown in FIG. 2C; that is to say, it has a line shape that extends in the Y direction.

If the cylindrical lens 13 can be inserted in and removed from the optical path 8, when it is removed from the optical path 8, Koehler illumination can be realized.

When the cylindrical lens 13 is removed from the optical path 8, the light generated in the light sources 7 is incident on the fly-eye lens 9 and is converted to substantially collimated beams at the fly-eye lens 9.

These collimated beams are then reflected at the mirror 15 and are deflected towards the objective lens 19. Then, the collimated beams pass through the relay lens 17 and are focused at the middle of the objective lens 19, as shown in FIG. 2B. Thereafter, the beams are expanded and are irradiated onto the surface of the specimen 21 as Koehler illumination.

In this way, it is possible to change from line illumination to Koehler illumination simply by removing the cylindrical lens 13. That is, since either line illumination or Koehler illumination can be suitably used by inserting and removing the cylindrical lens 13 to and from the optical path 8, the range of applications of the microscope can be expanded.

Although the lens elements 11 in this embodiment have a hexagonal arrangement, they may instead be arranged as a square matrix.

However, since a dense arrangement of the lens elements 11 is better for preventing variations in illumination intensity, the hexagonal arrangement is preferable.

In this embodiment, although the lens elements 11 are arranged in the lens-element rows 10 without any gaps therebetween, gaps may be provided. In such a case, identical adjacent lens-element rows are shifted by a larger amount, equal to the radius in the Y direction plus half the gap size.

Furthermore, although an even number of lens-element rows 10 has been described in this embodiment, an odd number of rows may be used. For example, when the number of lens-element rows 10 is large, since the effect of one row on the intensity variation is small, there are cases where it is preferable to use an odd number of rows, depending on the space where they are to be installed.

Moreover, although the light sources 7 and the lens elements 11 are provided in one-to-one correspondence in this embodiment, the present embodiment is not limited to this configuration.

As discussed above, one embodiment of the microscope includes a plurality of light sources, a fly-eye lens having a plurality of lens elements arrayed in a rectangular shape corresponding to the light sources, the light sources being disposed at the focal points thereof, a cylindrical lens having a flat orthogonal to the optical axis of light emitted from the fly-eye lens, and a cylindrical surface whose longitudinal axis is disposed parallel to the arrayed direction of the fly-eye lens, and an objective lens that illuminates a specimen with light from the cylindrical lens. According to this embodiment, since the light sources are disposed at the focal points, the light beams incident on the lens elements from the light sources are output as substantially collimated beams. By arranging the lens elements of the fly-eye lens in a rectangular shape, the luminous flux emitted from the fly-eye lens forms a rectangular collimated beam by combining the collimated beams from the individual lens elements.

The collimated light that is incident substantially vertically on the flat surface of the cylindrical lens does not experience refraction in the longitudinal-axis direction of the cylindrical surface, and is therefore emitted from the cylindrical lens with the same beam width. On the other hand, refraction along the optical path occurs at the surface orthogonal to the longitudinal axis, and the light is eventually focused to a straight line. The light focused to a straight line passes through the objective lens and is irradiated onto the specimen as line illumination.

The longitudinal axis of the cylindrical surface of the cylindrical lens is disposed substantially parallel to the arrayed direction of the fly-eye lens. Therefore, a light beam having a substantially uniform width in the arrayed direction of the fly-eye lens is focused in the longitudinal direction of the line illumination. Accordingly, since a light beam having a substantially uniform width is focused in the longitudinal direction of the line illumination, it is possible to achieve a uniformly bright illumination with low luminance variation, all the way to both ends thereof.

The term "rectangular shape" used herein means a substantially rectangular shape elongated in one direction; it also includes a shape having uneven edges, that is, edges with depressions and projections.

Furthermore, suitable light sources include those producing rectilinear rays of light, such as LEDs and so forth, or a two-dimensional light-source image produced by a projection optical system. With such devices, the light utilization efficiency at the emission stage is better than light sources using optical fibers, for example.

In the embodiment where the fly-eye lens preferably is formed in a rectangular shape by a plurality of lens-element rows in which the lens elements are arrayed in a straight line, this configuration permits the lens elements to be arranged easily in a rectangular shape.

In this arrangement, identical adjacent lens-element rows are arranged so as to be shifted in the arrayed direction by substantially half of the array pitch of the lens elements constituting the lens-element rows. With this configuration, since the lens elements in adjacent lens-element rows are arranged between adjacent lens elements, it is possible to reduce light intensity variations in the arrayed direction. Therefore, the apparatus can be reduced in size, and it is possible to achieve a brighter uniform line illumination at the same size.

In this embodiment, the number of lens-element rows preferably is even. With this configuration, there is no change in the number of lens elements in the arrayed direction and it is possible to educe variations in the focused light intensity. Accordingly, a more uniform line illumination can be achieved.

In one aspect of the invention, the light sources and the lens elements are preferably arranged in one-to-one correspondence, and the numerical apertures thereof are made to match. With this configuration, since all of the light from the light source is incident on the corresponding lens elements and is not incident on other lens elements, the light emitted from the lens elements can be made more collimated in practice, to be used as a line illumination. Therefore, since all of the light entering the collimator lenses serves as illumination, without limiting light directed towards the collimator lenses from the light sources, the light utilization efficiency can be increased compared to the conventional case where, for example, only light incident via slits is used.

As discussed above, the radius of the each lens element preferably is from 1.5 mm to 5 mm, inclusive. If the radius of each of the lens elements is less than 1.5 mm, it is difficult to integrate the light sources. If the radius of each of the lens elements is greater than 5 mm, the spaces between the lens elements, that is, the parts where there is no light, become large, resulting in impractically large variations in the line illumination.

What is claimed is:

1. A microscope comprising:
   a plurality of light sources;
   a fly-eye lens having a plurality of lens elements arrayed in a rectangular shape corresponding to the light sources, the light sources being disposed at the focal points thereof;
   a cylindrical lens having a flat surface orthogonal to the optical axis of light emitted from the fly-eye lens, and a cylindrical surface whose longitudinal axis is disposed parallel to the arrayed direction of the lens elements of the fly-eye lens; and
   an objective lens that focuses a light from the cylindrical lens,
   wherein the cylindrical lens is disposed in an optical path of the fly-eye lens, and is inserted in or removed from the optical path.

2. A microscope according to claim 1, wherein the fly-eye lens is formed in a rectangular shape by a plurality of lens-element rows in which the lens elements are arrayed in a straight line.

3. A microscope according to claim 2, wherein identical adjacent lens-element rows are arranged so as to be shifted in the arrayed direction by substantially half of an array pitch of the lens elements constituting the lens-element rows.

4. A microscope according to claim 3, wherein the number of lens-element rows is even.

5. A microscope according to claim 1 wherein the light sources and the lens elements are arranged in one-to-one correspondence and the numerical apertures thereof are made to match.

6. A microscope according to claim 1, wherein the radius of each lens element is from 1.5 mm to 5 mm, inclusive.

7. A microscope according to claim 1, wherein the surface of a sample is illuminated by line illumination when the cylindrical lens is inserted in the optical path of the fly-eye lens, and illuminated by Koehler illumination when the cylindrical lens is removed from the optical path of fly-eye lens.

8. A microscope according to claim 1, further comprising:
   a relay lens that relays an image formed by the cylindrical lens,
   wherein, when the cylindrical lens is inserted in the optical path of the fly-eye lens, light emitted from the fly-eye lens, in a plane orthogonal to the longitudinal axis, is focused in the middle of the relay lens, is made incident on the objective lens, and is focused by the objective lens, and in a plane including the longitudinal axis and the optical axis, is focused in the middle of the objective lens and is expanded for illumination; and
   wherein, when the cylindrical lens is removed from the optical path of the fly-eye lens, light emitted from the fly-eye lens is focused in the middle of the objective lens and is expanded for illumination.

* * * * *